US010825246B2

(12) United States Patent
Lukáů et al.

(10) Patent No.: US 10,825,246 B2
(45) Date of Patent: Nov. 3, 2020

(54) GENERATING IMMERSIVE TRIP PHOTOGRAPH VISUALIZATIONS

(71) Applicant: Adobe Inc., San Jose, CA (US)

(72) Inventors: Michal Lukáů, San Jose, CA (US); Zhili Chen, San Jose, CA (US); Jan Brejcha, Liberec (CZ); Martin Cadik, Sezemice (CZ)

(73) Assignees: Adobe Inc., San Jose, CA (US); Brno University of Technology, Brno (CZ)

( * ) Notice: Subject to any disclaimer, the term of this patent is extended or adjusted under 35 U.S.C. 154(b) by 89 days.

(21) Appl. No.: 16/144,487

(22) Filed: Sep. 27, 2018

(65) Prior Publication Data

US 2020/0105059 A1 Apr. 2, 2020

(51) Int. Cl.
| | |
|---|---|
| *G06T 19/00* | (2011.01) |
| *G06K 9/00* | (2006.01) |
| *G06T 7/73* | (2017.01) |
| *G06F 16/29* | (2019.01) |
| *G06F 16/583* | (2019.01) |
| *G06F 3/048* | (2013.01) |

(52) U.S. Cl.
CPC .......... *G06T 19/003* (2013.01); *G06F 3/048* (2013.01); *G06F 16/29* (2019.01); *G06F 16/583* (2019.01); *G06K 9/00697* (2013.01); *G06T 7/73* (2017.01)

(58) Field of Classification Search
CPC ........ G06F 3/048; G06F 16/29; G06F 16/583; G06T 19/003; G06T 7/73; G06K 9/00697
See application file for complete search history.

(56) References Cited

U.S. PATENT DOCUMENTS

| | | | |
|---|---|---|---|
| 2004/0218910 A1* | 11/2004 | Chang ............... | G01C 21/3647 386/241 |
| 2008/0028341 A1* | 1/2008 | Szeliski ............. | G06F 3/04815 715/854 |
| 2012/0169734 A1* | 7/2012 | Snavely ............. | G06K 9/00637 345/419 |

(Continued)

OTHER PUBLICATIONS

Hsieh et al., "Photo Navigator," MM 2008, ACM, pp. 419-428 (Year: 2008).*

(Continued)

*Primary Examiner* — Eric J. Bycer
(74) *Attorney, Agent, or Firm* — SBMC

(57) ABSTRACT

A user selects a set of photographs from a trip through an environment that he or she desires to present to other people. A collection of photographs, including the set of photographs captured during the trip optionally augmented with additional photographs obtained from another collection, are combined with a terrain model (e.g., a digital elevation model) to extract information regarding the geographic location of each of the photographs within the environment. The collection of photographs are analyzed, considering their geolocation information as well as the photograph content to register the photographs relative to one another. This information for the photographs is compared to the terrain model in order to accurately position the viewpoint for each photograph within the environment. A presentation of the selected photographs within the environment is generated that displays both the selected photographs and synthetic data filled in beyond the edges of the selected photographs.

20 Claims, 7 Drawing Sheets

(56) References Cited

U.S. PATENT DOCUMENTS

| | | | | |
|---|---|---|---|---|
| 2014/0010407 | A1* | 1/2014 | Sinha | G06K 9/00664 |
| | | | | 382/103 |
| 2014/0314322 | A1* | 10/2014 | Snavely | G06K 9/00664 |
| | | | | 382/190 |
| 2016/0291834 | A1* | 10/2016 | De Vallois | G06F 3/04815 |
| 2017/0300511 | A1* | 10/2017 | Brewington | G06F 16/29 |
| 2018/0365891 | A1* | 12/2018 | Kuang | G06T 17/05 |

OTHER PUBLICATIONS

Balabanovic,"Storytelling with Digital Photographs", Apr. 2000, 8 pages.

Bederson,"Does Animation Help Users Build Mental Maps of Spatial Information?", Sep. 1998, 8 pages.

Chelaramani,"An Interactive Tour Guide for a Heritage Site", Oct. 2017, pp. 2943-2952.

Chen,"Object Modeling by Registration of Multiple Range Images", Apr. 1991, pp. 2724-2729.

Chippendale,"Collective Photography", Nov. 2009, 6 pages.

Claudia,"Value of augmented reality at cultural heritage sites: A stakeholder approach", Jun. 2017, 3 pages.

Dalvandi,"Panoramic Video Techniques for Improving Presence in Virtual Environments", Jan. 2011, 9 pages.

Devine,"Place and Time: Creating Contextualized Presence for Virtual Heritage", Sep. 2007, pp. 65-72.

Du,"Social Street View: Blending Immersive Street Views with Geo-tagged Social Media", Jul. 22, 2016, 9 pages.

Du,"Video Fields: Fusing Multiple Surveillance Videos into a Dynamic Virtual Environment", Jul. 22, 2016, 8 pages.

Graham,"Time as Essence for Photo Browsing through Personal Digital Libraries", Proceedings of the 2nd ACM/IEEE-CS Joint Conference on Digital Libraries, Jul. 13-17, 2002, Portland, OR, USA, Jul. 13, 2002, pp. 326-335.

Harada,"Lost in Memories: Interacting With Photo Collections on PDAs", Jul. 2004, pp. 325-333.

Haugstvedt,"Mobile Augmented Reality for Cultural Heritage: A Technology Acceptance Study", Nov. 2012, pp. 247-255.

Haydar,"Virtual and augmented reality for cultural computing and heritage: A case study of virtual exploration of underwater archaeological sites", Nov. 2011, 27 pages.

Hilliges,"Photohelix: Browsing, Sorting and Sharing Digital Photo Collections", Oct. 2007, 8 pages.

Kabsch,"A solution for the best rotation to relate two sets of vectors", Sep. 1976, 2 pages.

Kaneva,"Infinite Images: Creating and Exploring a Large Photorealistic Virtual Space", Proceeding of the IEEE, vol. 98, No. 8, Aug. 2010, 17 pages.

Kang,"Visualization Methods for Personal Photo Collections: Browsing and Searching in the PhotoFinder", Multimedia and Expo, 2000. ICME 2000. 2000 IEEE International Conference, Jul. 30-Aug. 2, 2000, New York, NY, available at <http://www.cs.umd.edu/hcil/photolib/paper/ICME2000-final.doc>, Jul. 30, 2000, 4 pages.

Kim,"Joint Photo Stream and Blog Post Summarization and Exploration", Jun. 29, 2015, pp. 3081-3089.

Kopf,"First-person Hyper-lapse Videos", Aug. 1, 2014, 10 pages.

Kraljic,"Interactive Video Virtual Tours", Dec. 2008, 8 pages.

Kuchelmeister,"The Amnesia Atlas. An Immersive SenseCam Interface as Memory-prosthesis", Jun. 2015, 7 pages.

Kushal,"Photo Tours", in Proceedings—2nd Joint 3DIM/3DPVT Conference: 3D Imaging, Modeling, Processing, Visualization and Transmission, 3DIMPVT, Oct. 2012, 8 pages.

McCurdy,"RealityFlythrough: Enhancing Situational Awareness for Medical Response to Disasters Using Ubiquitous Video", AMIA Annual Symposium proceedings, Feb. 2005, 6 pages.

Moulon,"Global Fusion of Relative Motions for Robust, Accurate and Scalable Structure from Motion", in 2013 IEEE International Conference on Computer Vision, Oct. 15, 2013, 8 pages.

Oonuki,"VR BBS Using Immersive Virtual Environment", Mar. 2008, pp. 1006-1011.

Patterson,"SUN Attribute Database: Discovering, Annotating, and Recognizing Scene Attributes", In Proc. CVPR, 2012, Jun. 16, 2012, 8 pages.

Piguillet,"Spatial Navigation for Context-aware Video Surveillance", Apr. 21, 2010, 89 pages.

Platt,"AutoAlbum: Clustering Digital Photographs using Probabilistic Model Merging", Proceedings of the IEEE Workshop on Content-Based Access of Image and Video Libraries, Jun. 2000, 6 pages.

Platt,"PhotoTOC: Automatic Clustering for Browsing Personal Photographs", Proceedings of the 2003 Joint Conference of the 4th International Conference on Information, Communications and Signal Processing, Dec. 2003, 5 pages.

Pomerleau,"Comparing ICP Variants on Real-World Data Sets", Jan. 22, 2013, 17 pages.

Radiano,"Story Albums: Creating Fictional Stories from Personal Photograph Sets", Apr. 11, 2017, 12 pages.

Rodden,"How Do People Manage Their Digital Photographs?", ACM Press, Apr. 2003, 8 pages.

Schoeffmann,"3D Interfaces to Improve the Performance of Visual Known-Item Search", Jun. 2014, 10 pages.

Schonberger,"A Vote-and-Verify Strategy for Fast Spatial Verification in Image Retrieval", Nov. 2016, 17 pages.

Schonberger,"Structure-from-Motion Revisited", In 2016 IEEE Conference on Computer Vision and Pattern Recognition, Dec. 2016, 10 pages.

Sebe,"3D Video Surveillance with Augmented Virtual Environments", In First ACM SIGMM International Workshop on Video Surveillance, Nov. 2003, 6 pages.

Shan,"Photo Uncrop", Sep. 2014, 15 pages.

Slater,"Depth of Presence in Virtual Environments", Jan. 1994, 33 pages.

Smith,"Stopmotion Photowalk Animation for Spatial Immersion in a Remote Cultural Heritage Site", Jul. 2015, pp. 298-305.

Snavely,"Finding Paths through the World's Photos", Aug. 11, 2008, 11 pages.

Snavely,"Modeling the World from Internet Photo Collections", International Journal of Computer Vision, vol. 80, Issue 2—Available at <http://phototour.cs.washington.edu/ModelingTheWorld_ijcv07.pdf>, Nov. 2008, 22 pages.

Snavely,"Photo Tourism: Exploring Photo Collections in 3D", International Conference on Computer Graphics and Interactive Techniques, Available at <http://phototour.cs.washington.edu/Photo_Tourism.pdf>, Jul. 2006, 12 pages.

Tompkin,"Video Collections in Panoramic Contexts", Oct. 8, 2013, 10 pages.

Torniai,"Sharing, Discovering and Browsing Geotagged Pictures on the Web", May 15, 2007, 19 pages.

Wang,"Accurate Georegistration of Point Clouds using Geographic Data", 2013 International 3DTV-Conference, Jun. 2013, 8 pages.

Wang,"Contextualized Videos: Combining Videos with Environment Models to Support Situational Understanding", IEEE Transactions on Visualization and Computer Graphics 13, 6, Dec. 2007, 9 pages.

Wang,"Effects of Video Placement and Spatial Context Presentation on Path Reconstruction Tasks with Contextualized Videos", IEEE Transactions on Visualization and Computer Graphics 14, 6, Nov. 2008, pp. 1755-1762.

Wu,"Multicore Bundle Adjustment", Jun. 2011, pp. 3057-3064.

Wu,"PhotoScope: Visualizing Spatiotemporal Coverage of Photos for Construction Management", In Proceedings of the SIGCHI Conference on Human Factors in Computing Systems (CHI '09), Apr. 4, 2009, 11 pages.

Wu,"Towards Linear-time Incremental Structure from Motion", Proceedings of the 2013 International Conference on 3D Vision, May 29, 2013, 8 pages.

Zhang,"Determining the Epipolar Geometry and its Uncertainty: A Review", Mar. 1998, 38 pages.

Zhou,"Places: A 10 million Image Database for Scene Recognition", Jul. 4, 2017, 14 pages.

(56) References Cited

OTHER PUBLICATIONS

Zhu,"Faithful Completion of Images of Scenic Landmarks using Internet Images", Jul. 6, 2016, 15 pages.

* cited by examiner

GENERATING IMMERSIVE TRIP PHOTOGRAPH VISUALIZATIONS

BACKGROUND

When photographers go on trips, they typically take many photographs of the natural landscape they travel through. In the process of curation, most of these are discarded in favor of a handful of the most aesthetic ones that can then be presented to friends and family, or exhibited online or offline. However, because the end viewer only gets to see a small handful of views of a potentially extensive natural environment, the feeling of presence is lost. Furthermore, simply presenting or exhibiting single photographs does a poor job of conveying the sense of being in the area of interest and of how the landscape features in the images spatially relate to each other. Thus, these previous techniques implemented in conventional photograph display applications resulted in inefficient use and operation of the computing device in displaying photographs from a trip.

SUMMARY

Generation of immersive trip photograph visualizations as implemented by a computing device is described to provide a viewer of photographs from a trip with an immersive experience as if the viewer were "in" the space where the trip took place. In one example, a set of photographs taken on a trip in which a user followed a path through a geographical area is obtained. An indication of the geographical area where the set of photographs were captured is also received. Both a location and an orientation of ones of the set of photographs within a three dimensional terrain model of the geographical area is determined. An indication of user-selected photographs of the set of photographs is also received, and a fly-through view through the three dimensional terrain model is generated. The fly-through view is along the path through the geographical area, and includes each of the user-selected photographs as well as data from the three dimensional terrain model that fills in data beyond the user-selected photographs.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
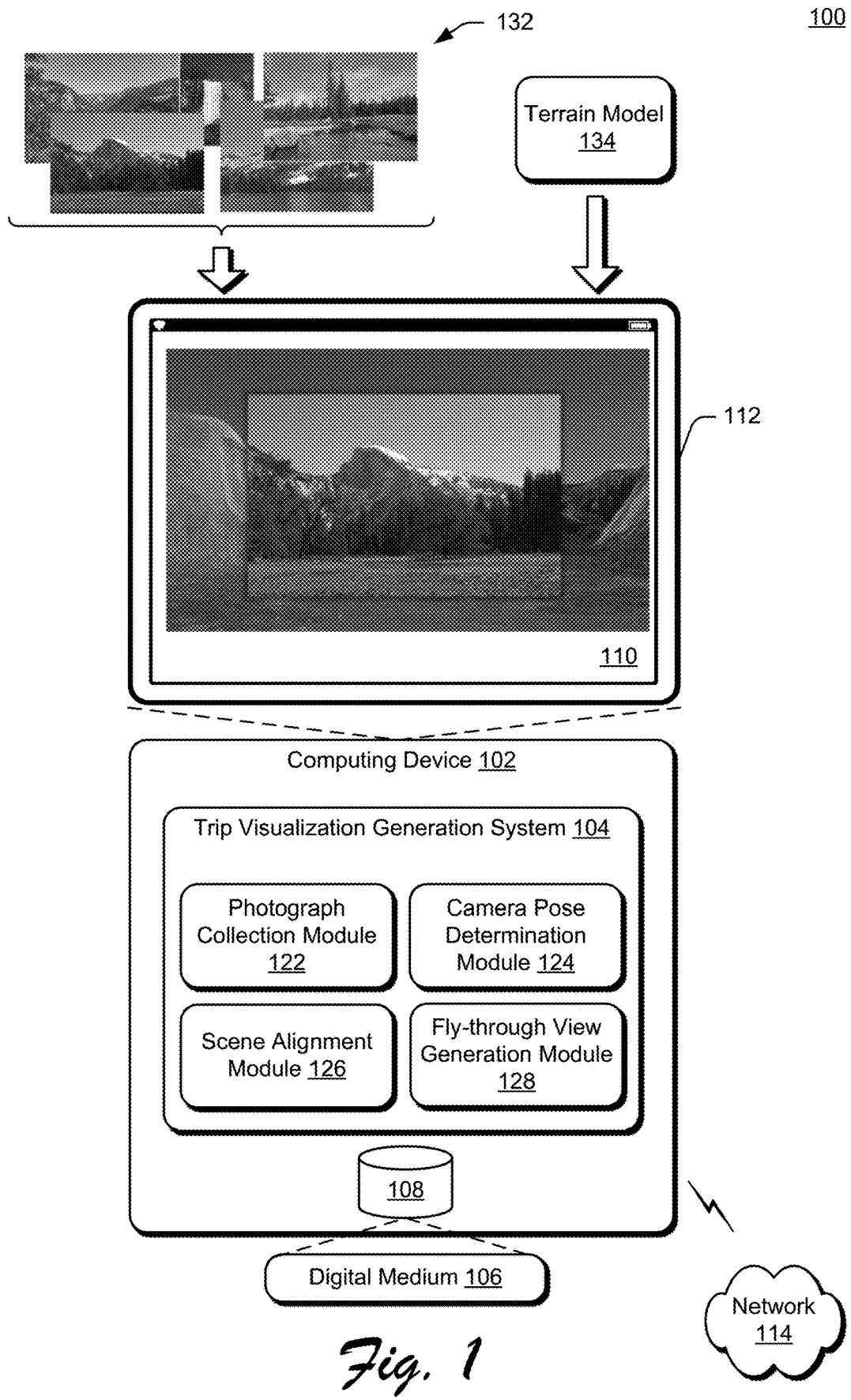
FIG. 1 is an illustration of a digital medium generation environment in an example implementation that is operable to employ generating immersive trip photograph visualizations techniques described herein.

Generating immersive trip photograph visualizations that provide a user with an immersive experience when viewing photographs from a trip without sacrificing the brevity of viewing only selected photographs from the trip are discussed herein. A trip refers to a journey or path taken by a user through an environment, such as a hike or bicycle ride along a trail, a ride in a car, and so forth. The techniques discussed herein take a small set of selected images and display them in a synthesized spatial context, allowing the viewer to understand the spatial relationships in the environment and be able to better appreciate the landscape, or repeat the trip themselves. In doing so, the information present in the discarded (non-selected) photos is also used to improve the viewing experience, providing additional information to assist in placing the selected images in the synthesized spatial content.

Generally, in accordance with the techniques discussed herein, the user selects a set of photographs from the trip through the environment that he or she desires to present to other people. The full set of photographs captured during the trip (both those discarded and those selected during the curation process) are combined with a terrain model (e.g., a digital elevation model) to extract information regarding the geographic location of each of the photographs within the environment. The full set of photographs captured during the trip are analyzed, considering their geographic location information as well as the photograph content using stereometric alignment and reconstruction to register the photographs relative to one another. This information for the photographs is compared to the digital elevation model in order to accurately position the geographic location and orientation for each photograph within the environment. This information is further leveraged to fill in the space beyond the edges of the selected photographs with synthetic data by rendering the digital elevation model to provide spatial context for the selected photographs.

A fly-through view of the trip is then generated. A fly-through view refers to a presentation of the selected photographs within the environment, including displaying both the selected photographs and synthetic data filled in beyond the edges of the selected photographs. The fly-through view can be a passive fly-through view, where a view from the user's perspective moving through the environment from image to image (e.g., as if taking the trip himself or herself) is displayed, the fly-through view serving as a transition from one selected photograph to another. Additionally or alternatively, the fly-through view can be an interactive fly-through view, where the user is able to look at a virtual reality (VR) display of the environment at the location where a selected photograph was taken and from a first-person viewpoint.

The fly-through view of the trip enriches the presentation of the selected photographs both by adding missing information beyond the edge of the photographs (e.g., for virtual reality viewing or exploration) and to visualize the route of the trip from a first-person perspective. The fly-through view is a model of the trip that includes the selected photographs enriched by the digital elevation model. The information obtained by analyzing the photographs can also be used for image or catalog management, enabling operations such as selecting photographs with a certain feature (e.g., landscape element) in the photograph.

More specifically, the process for generating the fly-through view includes obtaining a set of photographs captured during the user's trip. Photographs can be captured by various different image capturing devices, including both perspective and spherical cameras. First, the set of photographs is preprocessed based on metadata associated with the photographs (e.g., exchangeable image file format (EXIF) information), such as focal length, camera sensor size, and estimated geospatial position (e.g., Global Positioning System (GPS) location) being extracted, and the photographs are uniformly resized to a common width (e.g., 1200 pixels). From each spherical panorama, several perspective images are sampled and used as the photographs in further processing. To estimate relative relationships between photographs, a structure from motion (sfm) pipeline is used. Visual features are extracted from each photograph, and feature matching and geometrical verification using fundamental matrix filtering is used to calculate point correspondences between the photographs. The correspondences are organized into a match graph (a scene graph) that is used to explore connected components of photographs. Each connected component depicts a single landmark.

The structure from motion technique of global reconstruction is used to recover a 3D (3 dimensional) point cloud of a landmark in the photographs and corresponding camera parameters. Structure from motion reconstruction is first performed with bundle adjustment without using GPS locations of the photographs, resulting in a 3D point cloud with camera parameters relative to each other. Then, robust estimation of similarity transformation into the world coordinates is applied using, for example, a least median of squares algorithm. The transformation is estimated between relative camera positions and their corresponding positions in real world coordinates (e.g., known from GPS metadata associated with the photographs). Because the GPS coordinates are often imprecise, the estimated parameters of the point cloud and the corresponding cameras may not be accurate. To address the inaccuracies, the 3D point cloud is registered with the terrain model using an Iterative Closest Points (ICP) algorithm. Because camera locations need to be situated above the ground, the cameras are moved 1.8 meters above the ground, and the camera orientation is re-estimated using 2D-3D correspondences. The resultant output is a collection of connected components of photographs with recovered camera parameters (location, orientation, scale, etc.) with respect to the world coordinate system.

The cameras are visualized by rendering the photographs in the virtual terrain (e.g., based on digital terrain data and satellite imagery). Panoramic images are rendered as spheres, perspective images are rendered as planes. Camera locations are sorted chronologically according to the time of creation (e.g., time of capture of the photographs). A virtual tour along the photographs is automatically generated by fitting a Catmull-Rom spline through the camera locations or alternatively by following an external GPS route. Each point of the spline is restricted to be placed above the digital terrain. An animation or video is generated as the virtual camera flies from one photograph to another by interpolating its location and orientation smoothly, following the generated spline. Once the camera approaches the photograph, the photograph is shown by a smooth interpolation from transparent to opaque. The camera stops, and in interactive mode, the user can freely look around. In response to the user's request, the animation continues first by hiding the photo using a smooth transition from opaque to transparent, and then by proceeding to the next photograph.

By aligning the camera viewpoints with the terrain, filling in the missing geometry information and then providing a ground-level view as part of the visualization, the techniques discussed herein utilize information from even the discarded photographs to put the viewer "in" the space where the trip took place. This mode of viewing is more immersive for the viewer. Furthermore, the techniques can be used in other scenarios such as providing trip directions. Furthermore, these photographs can be analyzed (e.g., in a cloud setting) and mined to improve the digital elevation model and/or its textures.

Thus, in contrast to techniques that simply display a series of selected photographs as a slideshow, or display a map plotting locations where photographs were captured, the techniques discussed herein provide an immersive experience for the viewer. The viewer has the look and feel of moving through the 3D environment with the same orientation as the user had when the photographs were captured. As described in more detail below, the techniques discussed herein employ various different rules and criteria in determining how photographs are displayed to create this immersive experience.

Furthermore, in contrast to techniques that attempt to reconstruct the environment given the captured photographs, the techniques discussed herein do not perform such a full reconstruction. Rather, only enough photographs to be able to cross-reference the photographs with the terrain model need be used.

In the following discussion, an example environment is described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of a digital medium generation environment 100 in an example implementation that is operable to employ generating immersive trip photograph visualizations techniques described herein. The illustrated environment 100 includes a computing device 102, which may be configured in a variety of ways.

The computing device 102, for instance, may be configured as a desktop computer, a laptop computer, a mobile device (e.g., assuming a handheld configuration such as a tablet or mobile phone), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of multiple different devices, such as multiple servers utilized by a business to perform operations "over the cloud" as described in FIG. 10.

The computing device 102 is illustrated as including a trip visualization generation system 104. The trip visualization generation system 104 is implemented at least partially in hardware of the computing device 102 to allow a user of the computing device 102 to generate a digital medium 106, which is illustrated as maintained in storage 108 of the computing device 102. The digital medium 106 is content created as a fly-through view of a trip and that can be displayed in a user interface 110 for output, e.g., by a display device 112. The digital medium 106 can be a 3-dimensional (3D) model, a series of frames or images (e.g., video), or other digital media. Although illustrated as implemented locally at the computing device 102, functionality of the trip visualization generation system 104 may also be implemented in whole or part via functionality available via the network 114, such as part of a web service or "in the cloud."

An example of functionality incorporated by the trip visualization generation system 104 to allow immersive trip visualization generation by a user of the computing device 102 is illustrated as photograph collection module 122, camera pose determination module 124, scene alignment module 126, and fly-through view generation module 128. The trip visualization generation system 104 receives as input a set of photographs 132 captured by one or more cameras during a trip, and a terrain model 134 that is a 3D virtual representation of the surface of the terrain in the geographical area in which the trip was taken. The photograph collection module 122 implements functionality to obtain the set of photographs 132 and the terrain model 134. The camera pose determination module 124 implements functionality to identify visual features in the set of photographs 124 and given those features determine pose information (e.g., 3D location and orientation information) for the camera for each photograph in the set of photographs 124. The scene alignment module 126 implements functionality to use the pose information to align individual photographs of the set of photographs 124 with the terrain model 134. The fly-through view generation module 128 implements functionality to use the aligned individual photographs to generate a fly-through view of the trip. The fly-through view can be a passive fly-through view, where a view of the user moving through the environment from photograph to photograph (e.g., as if taking the trip himself or herself) is displayed, the fly-through view serving as a transition from one selected photograph from the set of photographs 132 to another. Additionally or alternatively, the fly-through view can be an immersive fly-through view, where the user is able to look at a virtual reality (VR) display of the environment at the location where a selected photograph was taken and from a first-person viewpoint.

Although particular functionality is discussed herein with reference to particular modules, it should be noted that the functionality of individual modules discussed herein can be separated into multiple modules, and/or at least some functionality of multiple modules can be combined into a single module. Additionally, a particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Figure 2:
FIG. 2 illustrates an example map of a trip.

FIG. 2 illustrates an example map of a trip. An aerial view 200 of a geographical area that is a hiking area is illustrated, with a path 202 displayed. The path 202 is the path that the user took when hiking through the hiking area. The path 202 can be determined in a variety of different manners, such as from location tracking of the user during the hike (e.g., from a GPS device), input from the user (e.g., specifying a state or national park trail that he or she hiked), location data included in metadata of photographs taken during the hike, and so forth. In the illustrated example, the path begins at a location 204, passes through a valley and does a loop in the hills, and returns to location 204. The path 202 can be generated, for example, by the fly-through view generation module 128 fitting a Catmull-Rom spline through the camera locations.

Figure 3:
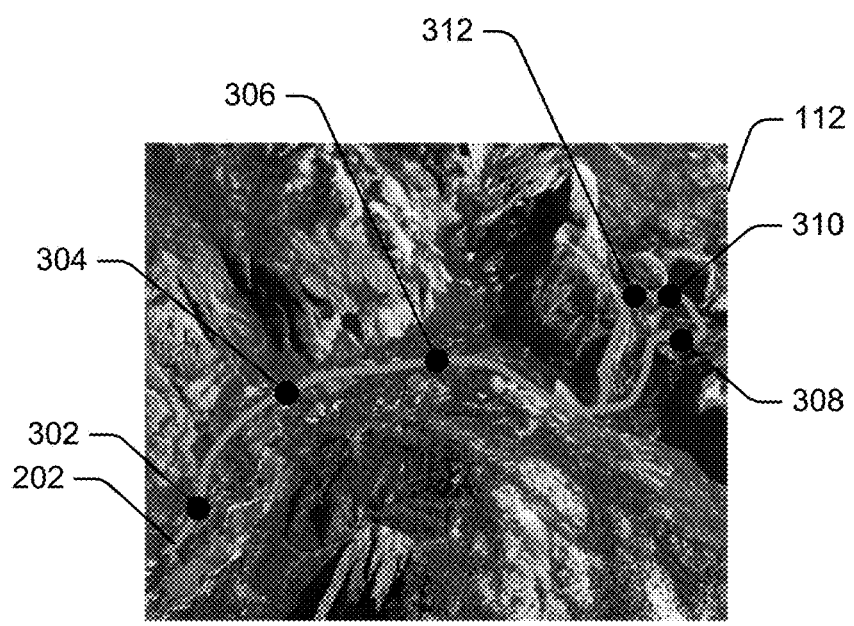
FIG. 3 illustrates an example map of a trip with indications of where photographs were taken.

FIG. 3 illustrates an example map of a trip with indications of where photographs were taken. The aerial view 200 of the hiking area is illustrated with the path 202 displayed. Furthermore, locations 302, 304, 306, 308, 310, and 312 (illustrated as dots on the path 202) indicate locations where photographs were captured during the hike.

FIGS. 4-8 illustrate example images from a fly-through view generated for the hike along path 202. The fly-through view generated for the hike along path 202 is a sequence of images that are or can be displayed to the user as a video. The fly-through view follows the path the user took during the hike. In the illustrated example, the fly-through view starts at the beginning of the path (location 204 of FIG. 2), passes through a valley and does a loop in the hills, and returns to the starting location (location 204).

Figure 4:
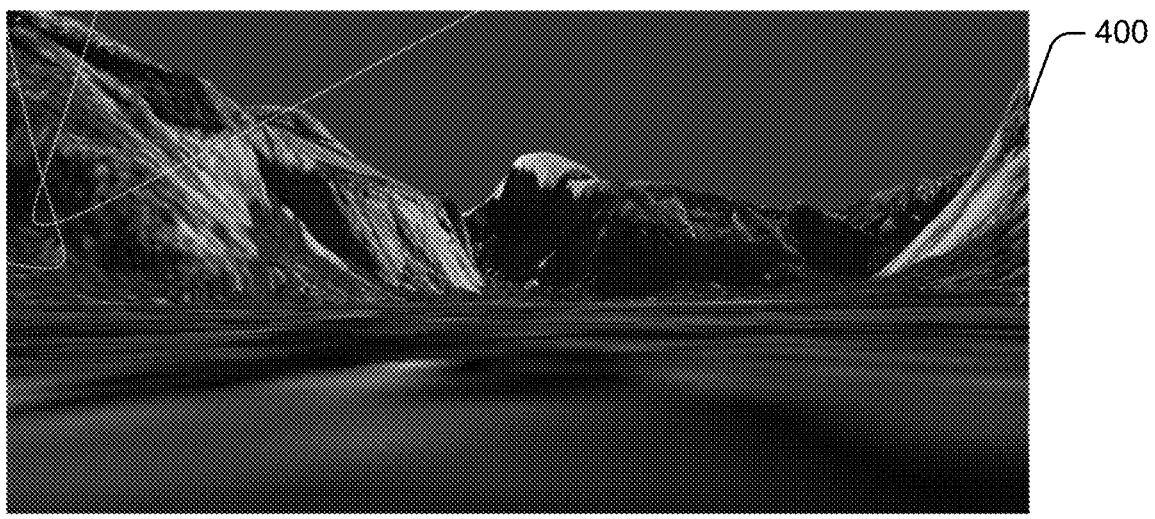
FIGS. 4-8 illustrate example images from a fly-through view generated for the hike along a path.

The fly-through view begins with displaying images along the path 202 generated from the terrain model. An example is illustrated in FIG. 4 with the image 400 being an image from the terrain model along the path, such as along the path 202 as the user hikes from location 306 to location 308.

Figure 5:
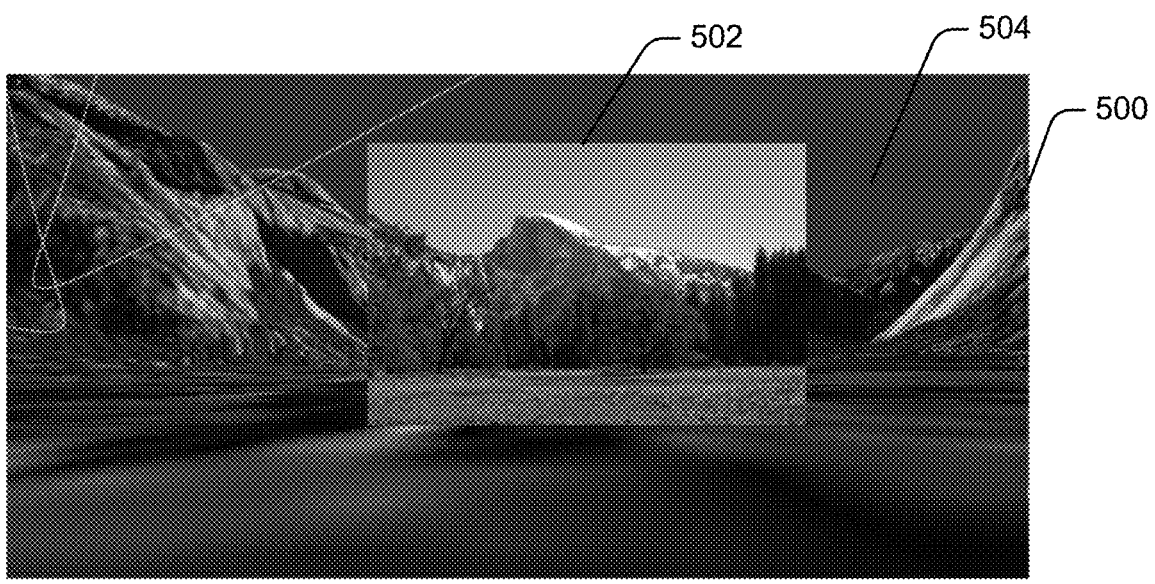

The fly-through view continues to display images along the path 202 generated from the terrain model until the user approaches a location where a photograph was taken. For example, as the fly-through view reaches the location 308, rather than just displaying an image from the terrain model, an actual photograph taken by the user is displayed and the area beyond the photograph is filled in with data from the terrain model. An example is illustrated in FIG. 5 with the image 500 illustrating a photograph 502 with data from the terrain model filled in beyond the edges of the photograph 502. This fill-in data is a part 504 of the image 500 displayed beyond the perimeter of the photograph 502.

Figure 6:
Figure 7:
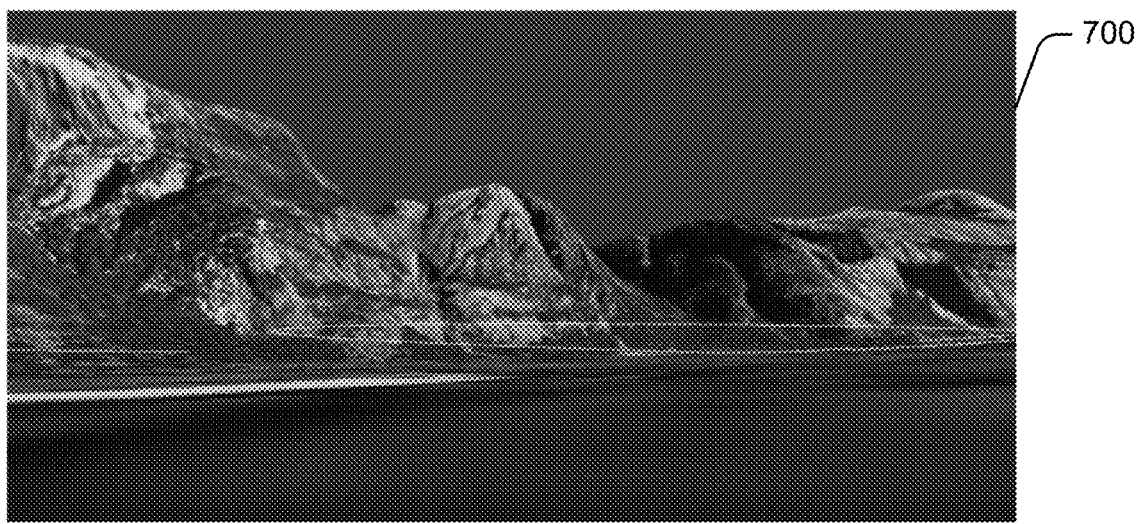

After passing the location 308, the fly-through view continues with displaying images along the path 202 generated from the terrain model. Examples are illustrated in FIGS. 6 and 7 with the images 600 and 700 each being an image from the terrain model along the path 202 as the user hikes from location 308 to location 310.

Figure 8:
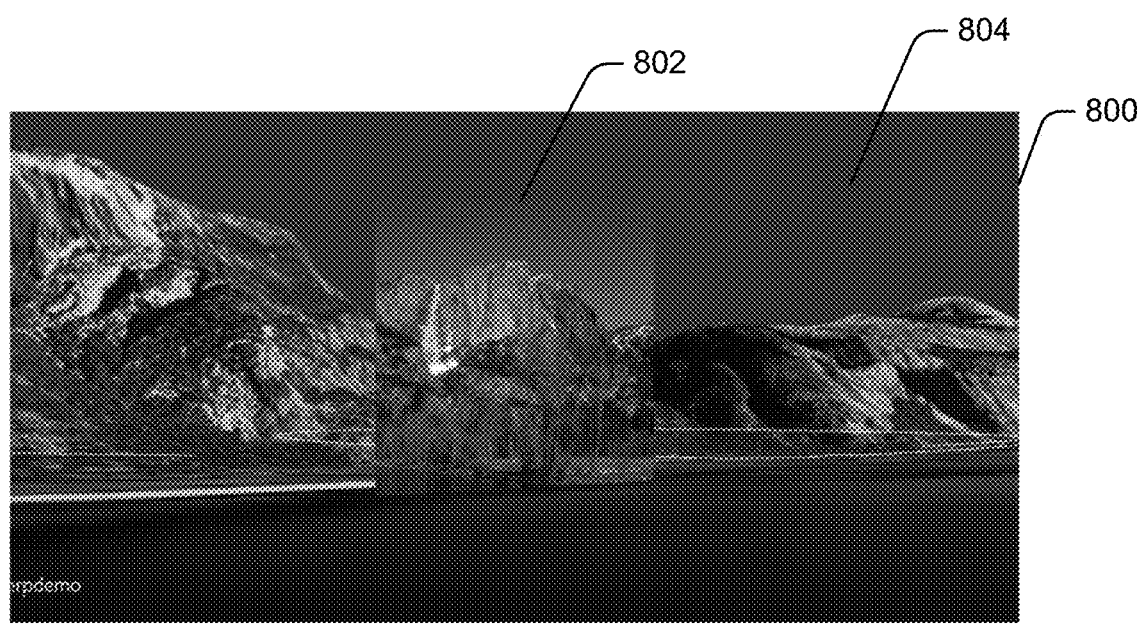

The fly-through view continues to display images along the path 202 generated from the terrain model until the user approaches a location where a photograph was taken. For example, as the fly-through view reaches the location 310, rather than just displaying an image from the terrain model, an actual photograph taken by the user is displayed and the area beyond the photograph is filled in with data from the terrain model. An example is illustrated in FIG. 8 with the image 800 illustrating a photograph 802 with data from the terrain model filled in beyond the edges of the photograph 802. This fill-in data is a part 804 of the image 800 displayed beyond the perimeter of the photograph 802.

The fly-through view generated for a trip can be a passive fly-through view or an interactive fly-through view. In a passive fly-through view, the fly-through view is displayed to the user as a video, pausing for a threshold amount of time (e.g., 5 seconds) to display each photograph before proceeding to the next photograph along the path.

In the fly-through view can be an interactive fly-through view, where the user is able to look at a VR display of the environment at the location where a selected photograph was taken and from a first-person viewpoint. For example, a video can be displayed of the fly-through until the fly-through view reaches one of the locations where a photograph was taken (e.g., one or more of the locations 302, 304, 306, 308, 310, and 312). At the location where the photograph was taken, a VR display of that location is displayed to the user, allowing the user to look around (e.g., using a VR headset or goggles) and see different aspects of the environment at that location. This VR display can be the photograph taken (e.g., if a spherical camera or panoramic camera was used to take the photograph) or the photograph taken with data from the terrain model filled in beyond the edges of the photograph. The VR display can be maintained for a threshold amount of time (e.g., 10 seconds) or until some event occurs (e.g., a user request to continue the fly-through is received).

In one or more implementations, fly-through views employ a smooth transition between the images along the path generated from the terrain model and the photographs. Various different smooth transition can be used. For example, the photographs can fade in (e.g., from transparent to opaque) over a particular amount of time (e.g., 4 seconds), remain displayed for a threshold amount of time (e.g., 5 seconds), and then fade out (e.g., from opaque to transparent) over another particular amount of time (e.g., 3 seconds).

Returning to FIG. 1, photograph collection module 122 implements functionality to obtain the set of photographs 132 captured by one or more cameras during a trip, and the terrain model 134 that is a 3D virtual representation of the surface of the terrain in the geographical area in which the trip was taken. The set of photographs 132 can be obtained from storage 108 or elsewhere (e.g., an image capture device, a remote service, etc.). If the photographs have not previously been resized to a common width, the photograph collection module 122 uniformly resizes the obtained set of photographs to a common width (e.g., 1200 pixels). The photograph collection module 122 also obtains an indication of the geographical area in which the trip occurred. The indication of the geographical area in which the trip occurred can be obtained in any of a variety of different manners, such as from metadata associated with one or more of the photographs in the set of photographs 132 (e.g., GPS data). Additionally or alternatively, a user input specifying the geographical area can be received. This user input can take a variety of different forms, such as input of the name of a particular park or hiking area, drawing a geometric shape (e.g., circle or rectangle) on a map, and so forth. The indication of the geographical area in which the trip occurred facilitates determining the camera location because it reduces the area in the terrain model 134 that is analyzed in comparing features in the set of photographs 132 and the terrain model 134.

The user oftentimes desires to present only a selected subset of the photographs he or she took to other people. The fly-through view is generated and includes only those photographs selected by the user, although more of the photographs taken by the user can be used in generating the fly-through view. For example, only one photograph of a waterfall may be selected by the user, but multiple photographs of the waterfall are used in determining a camera pose for the selected one photograph as discussed in more detail below. Thus, the set of photographs 132 includes the photographs selected by the user for presentation to others, as well as additional photographs (e.g., all photographs taken during the trip).

In one or more implementations, the photograph collection module 122 augments the set of photographs 132 by adding in additional photographs from another collection. This collection can be cloud based services such as social media web sites, photograph archives or collections available to the developer or the distributor of the trip visualization generation system 104, photographs searchable via a web browser and an Internet search engine, and so forth. These additional photographs are also referred to as augmentation photographs. The augmentation photographs are used to assist in determining the camera pose by the camera pose determination module 124. However, the augmentation photographs are not included in and are not displayed as part of the fly-through view.

Whether to augment the set of photographs 132 with additional photographs from another collection can be determined in a variety of different manners. In one or more implementations, the photograph collection module 122 determines to augment the set of photographs 132 with additional photographs from another collection if the number of photographs in the set of photographs 132 is less than a threshold number (e.g., 200). In such situations, the photograph collection module 122 augments the set of photographs 132 with enough additional photographs from another collection so that the combined number of photographs (in the set of photographs 132 and the augmentation photographs) is at least the threshold number.

Additionally or alternatively, the photograph collection module 122 determines to augment the set of photographs 132 with additional photographs from another collection based on feedback from the camera pose determination module 124. For example, if there are at least a threshold number of photographs (e.g., 20) that capture a particular area (e.g., a mountain, a waterfall, a particular cluster of trees) on the trip, then the photograph collection module 122 does not obtain augmentation photos for that particular area. However, if there are not at least the threshold number of photographs (e.g., 20) that capture the particular area on the trip, then the camera pose determination module 124 communicates to the photograph collection module 122 to obtain additional photographs from another collection so that the combined number of photographs (in the set of photographs 132 and the augmentation photographs) that capture the particular area is at least the threshold number (e.g., 20).

In one or more implementations, the augmentation photographs are photographs from a collection that were captured at approximately the same geographical area as the geographical area of the trip. Approximately the same geographical area refers to a geographical area that is the same as, or within a threshold distance (e.g., 1 kilometer or 5 kilometers) as the geographical area of the trip. The geographical area of the photographs in the collection can be determined in various manners, such as from GPS data associated with the photographs (e.g., included as metadata for the photographs), other labels or geographic descriptors associated with the photographs (e.g., included as metadata for the photographs), and so forth.

Various additional criteria can be used to select the augmentation photographs. The criteria can be time-based, which can refer to the time of day, season of the year, and so forth. For example, augmentation photographs can be selected that were captured at approximately the same time of day as the trip (e.g., within 2 hours of the first photograph captured during the trip or of the last photograph captured during the trip), that were captured at approximately the same time of year as the trip (e.g., within two weeks of the trip, during the same season (e.g., winter, spring, summer, or fall) as the trip), and so forth.

Examples of other criteria that can be used to select the augmentation photographs include whether the photograph was captured indoors or outdoors (e.g., for an outdoors trip, augmentation photos that were captured outdoors rather than indoors are selected), whether the photograph was captured in an urban or nonurban setting, and so forth.

The criteria can be applied to select the augmentation photographs in a variety of different manners. In one or more implementations, each augmentation photograph has associated information (e.g., metadata associated with the photograph) and that associated information indicates a date and/or time the photograph was captured, whether the photograph was captured indoors or outdoors, whether the photograph was captured in an urban or nonurban setting, and so forth.

Additionally or alternatively, various different machine learning system can be used to select the augmentation photographs from those photographs in the collection that were captured at approximately the same geographical area as the geographical area of the trip. Machine learning systems refer to a computer representation that can be tuned (e.g., trained) based on inputs to approximate unknown functions. In particular, machine learning systems can include a system that utilizes algorithms to learn from, and make predictions on, known data by analyzing the known data to learn to generate outputs that reflect patterns and attributes of the known data. For instance, a machine learning system can include, decision trees, support vector machines, linear regression, logistic regression, Bayesian networks, random forest learning, dimensionality reduction algorithms, boosting algorithms, artificial neural networks, deep learning, and so forth.

For example, the photograph collection module 122 can apply a scene understanding neural network trained on a training dataset of photographs to find photographs that were most likely captured both outdoors and in a natural setting (nonurban setting). Given a photograph from the collection, the neural network estimates matching scores for a list of semantic categories. The semantic categories are a high-level representation of a place, for example a bedroom, a beach, or a mountain. For each semantic category, the training dataset defines whether the semantic category is indoors or outdoors. For the given photograph in the collection, the semantic categories with the highest scores (e.g., the ten highest scores) are selected. If the majority of the semantic categories with the highest selected scores for the given photograph in the collection are indoors, then the given photograph is classified as indoors; otherwise, the given photograph is classified as outdoors.

To implement the natural/unnatural setting classification, the photograph collection module 122 uses image attributes that are overlapping and with finer granularity than the semantic categories used for the indoors/outdoors classification. Examples of such image attributes include foliage, leaves, hiking, pavement, carpet, stressful, and so forth. The image attributes are clustered as either a natural setting (nonurban images) or an unnatural setting (everything else). For example, image attributes for the natural setting include foliage, leaves, and hiking, and image attributes for the unnatural setting include pavement, carpet, and stressful. The neural network estimates per-attribute correlations for a given photograph in the collection. All correlations for natural attributes are summed, and from that sum the correlations for the unnatural attributes are subtracted. If the result is greater than zero then the given photograph in the collection is classified as a natural setting; otherwise the given photograph in the collection is classified as an unnatural setting.

It should be noted that in situations in which the set of photographs 132 do not have GPS metadata but the augmentation photos do have GPS metadata, then the camera pose determination module 124 can get the GPS data from the augmentation photos instead. In other words, the trip visualization generation system 104 can get GPS data for the photographs in the set of photographs 132 even though the set of photographs 132 did not have associated GPS data when obtained by the photograph collection module 122.

The camera pose determination module 124 implements functionality to identify visual features in the set of photographs 124 and given those features determine pose information (e.g., 3D location and orientation information) for the camera for each photograph in the set of photographs 132. The camera pose determination module 124 uses the set of photographs 132 as well as any augmentation photographs obtained by the photograph collection module 122 to determine the pose information for the camera for each photograph in the set of photographs 124. The photographs used by the camera pose determination module 124 are also referred to as the collected photographs, and include both the set of photographs 132 and any augmentation photographs obtained by the photograph collection module 122, or include just the set of photographs. The pose information for the camera for a photograph refers to the 3D location and orientation of the camera at the time the camera captured the photograph.

Generally, the camera pose determination module 124 identifies visual features in the collected photographs. These visual features can be any of a variety of different visual features such as edges, corners, and so forth. A subset of photographs in the collection of photographs that include the same visual feature are identified, and the location of the visual feature in each photograph of the subset is used to determine the camera pose for each photograph in the subset relative to the other photographs in the subset. The camera pose determination module 124 mines the set of photographs 132 and any augmentation photographs for both GPS metadata and visual features, and uses those to obtain a rough geo-registration through a structure from motion (sfm) process.

Generally, structure from motion techniques refer to processes for reconstructing a 3D structure from its projections into a collection of photographs or images taken from different viewpoints (e.g., different camera poses). Various different visual features can be tracked, such as corner points (e.g., edges with gradients in multiple directions). These visual features are tracked from one photograph to another, and their trajectories over time are used to determine a 3D reconstruction of the portion of the environment captured by the photographs.

Various different public and/or proprietary structure from motion techniques can be employed by the camera pose determination module 124, such as incremental structure from motion techniques, hierarchical structure from motion techniques, global structure from motion techniques, and so forth. In one or more implementations, the camera pose determination module 124 uses an incremental structure from motion technique that includes a sequential processing pipeline with an iterative reconstruction component. The pipeline starts with a correspondence search stage that includes visual feature extraction and mapping, followed by geometric verification, resulting in a scene graph that is used for a reconstruction stage. In the reconstruction stage, a two-view reconstruction seeds a model before incrementally registering new photographs, triangulating scene points, filtering outliners, and refining the reconstruction using bundle adjustment.

More specifically, the correspondence search stage detects, for each photograph, sets of visual features in the photograph. The set of visual features for each photograph is used as an appearance description for the photograph, and photographs that see the same scene part are identified. For example, each photograph pair can be tested for scene overlap. The output of this matching is a set of potentially overlapping photograph pairs and their associated visual feature correspondences. The matching is based on appearance, so corresponding features in photographs may not actually map to the same scene point. Geometric verification is performed to verify the matches by attempting to estimate a transformation that maps feature points between photographs using projective geometry. If a valid transformation maps a sufficient number (e.g., at least a threshold number, such as 20) of features between two photographs, the photographs are considered geometrically verified. The geometric verification can be performed in different manners, such as by finding promising transformations through a voting strategy and using a limited (e.g., 256 k word) vocabulary tree. The output of this geometric verification is a set of geometrically verified photograph pairs, their associated inlier correspondences, and optionally a description of their geometric relation. This output also includes a scene graph with photographs as nodes and verified pairs of photographs as edges.

The reconstruction stage initializes a model with a two-view reconstruction by selecting two photographs (e.g., from a dense location in the scene graph). Additional photographs are registered to the current model by solving the Perspective-n-Point (PnP) problem using feature correspondences to triangulated points in already registered images (2D-3D correspondences). A newly registered photograph observes existing scene points, and may also increase scene coverage by extending the set of scene points through triangulation. A new scene point can be triangulated and added to the existing scene points as soon as at least one more image, also covering the new scene part but from a different viewpoint, is registered. Bundle adjustment is then performed, which is the joint non-linear refinement of camera parameters and point parameters that minimize a reprojection error from projecting scene points to photograph space. The output of the reconstruction stage are the camera pose estimates for the photographs and the reconstructed scene structure as a set of scene points. This set of scene points is also referred to as a 3D point cloud reconstruction.

An example of such a structure from motion technique is referred to as COLMAP, as discussed in "Structure-from-Motion Revisited," Johannes Lutz Schönberger and Jan-Michael Frahm, 2016 IEEE Conference on Computer Vision and Pattern Recognition (CVPR) pp. 4104-4113 (2016), and "A vote-and-verify strategy for fast spatial verification in image retrieval," Johannes L. Schönberger, True Price, Torsten Sattler, Jan Michael Frahm, and Marc Pollefeys, Computer Vision—ACCV 2016—13$^{th}$ Asian Conference on Computer Vision, Revised Selected Papers (Lecture Notes in Computer Science (including subseries Lecture Notes in Artificial Intelligence and Lecture Notes in Bioinformatics)), pp. 321-337 (2016).

Additionally or alternatively, various different techniques can be employed for geo-registration of the collected photographs. In one or more implementations, geo-registration of the collected photographs is performed using GPS data from at least the augmentation photographs. A robust Least Median of Squares technique combined with Random sample consensus (RANSAC) using Euclidean distance of the reconstructed camera location and the corresponding GPS location (residual). Rather than minimizing the sum of squared residuals, the median of the squared residuals is minimized, which is more robust towards outliers. Using this minimization approach, a similarity transformation to transform (translate, rotate, and scale) the scene into world coordinates is estimated. An example of such a technique is discussed in "Determining the Epipolar Geometry and its Uncertainty: A Review," Zhengyou Zhang, International Journal of Computer Vision 27, 2, pp. 161-195 (1998).

The scene alignment module 126 implements functionality to use the pose information to align individual photographs of the set of photographs 124 with the terrain model 134. Because of uncertainties in camera configuration, GPS location, and other parameters, there is no guarantee that the initial geo-registration performed by the camera pose determination module 124 actually matches the known terrain in the terrain model 134. To remedy this, the scene alignment module 126 aligns the reconstructed scene structure generated by the camera pose determination module 124 with the terrain model 134 to fine-tune the camera pose estimations generated by the camera pose determination module 124. The scene alignment module 126 can fine-tune the camera pose estimations generated by the camera pose determination module 124 in a variety of different manners.

In one or more implementations, the scene alignment module 126 fine-tunes the camera pose estimations generated by the camera pose determination module 124 by minimizing the Euclidean distance between the 3D point cloud reconstruction and the known terrain data from the terrain model 132. The scene alignment module 126 segments the 3D point cloud reconstruction into disjoint clusters so that two points in the same cluster are at most a threshold distance (e.g., 1 kilometer) apart from each other. For each cluster, the scene alignment module 126 calculates a bounding box for the cluster and samples the terrain on a grid with particular spacing (e.g., 10 meter spacing). The scene alignment module 126 aligns the 3D point cloud reconstruction and the sampled terrain using an iterative closest point (ICP) alignment technique.

The scene alignment module 126 can use any of a variety of different ICP techniques. In one or more implementations, the scene alignment module 126 employs an ICP technique that first reduces the size of both the 3D point cloud reconstruction and the point cloud from the terrain model 134, by random sampling, keeping a particular amount (e.g., 75%) of all points in the 3D point cloud reconstruction and keeping a particular amount (e.g., 75%) of all points in the point cloud from the terrain model 134. Next, the scene alignment module 126 iteratively performs a series of operations A, B, C, and D. Operation A: each point in each point cloud is matched to its nearest neighbors in Euclidean space. Operation B: points too far from the reference point cloud (outliers) are removed (e.g., a particular number, such as 85%, of points with the smallest distance are kept). Operation C: minimization of point-to-plane distance is performed. Operation D: check if convergence or the maximum number of iterations (e.g., 40) has been reached. Repeat operations A, B, C, and D until convergence or the maximum number of iterations has been reached.

After fine-tuning the camera pose estimations generated by the camera pose determination module 124, there can be mismatches remaining between the photograph content and the virtual terrain, which are typically due to bad information about camera configuration (e.g., focal length, exact GPS location, etc.). Furthermore, because of the limited sampling rate of the terrain model, some cameras may end up below the virtual terrain after the ICP alignment, which is solved by moving them vertically to the terrain height (e.g., increasing their height by a specific amount, such as 1.8 meters). However, both of these problems can introduce registration errors in camera orientation and projection parameters.

To correct the registration errors, the scene alignment module 126 leverages knowledge of the correspondences between 2D points observed in the set of photographs 132 and the 3D points in the terrain model 134. The scene alignment module 126 uses these correspondences to improve (e.g., optimize) the orientation and projection parameters. The scene alignment module 126 projects the 2D observations using camera parameters into 3D points in the terrain model 134 based on the Euclidean distance between camera center and the corresponding 3D point. From both the 2D observations and the 3D points, the scene alignment module 126 subtracts their centroids and calculates a rotation matrix to relate the 2D observations and the 3D points.

The fly-through view generation module 128 implements functionality to use the photographs from the set of photographs 132, as aligned by the scene alignment module 126, to generate a fly-through view of the trip through the terrain model. The fly-through view includes user-selected photographs from the set of photographs 132 (e.g., the photographs that the user has decided he or she wants to show others as part of a curation process). The fly-through view is a virtual presentation that shows selected photographs and renders fly-throughs from one camera pose to the next as a transition between the consecutive selected photographs.

The user can select that photographs from the set of photographs 132 at various different times. In one or more implementations, the user selects photographs from the set of photographs 132 after the alignment is performed by the scene alignment module 126. In situations in which a photograph of the set of photographs 132 could not be aligned by the scene alignment module 126 (e.g., the photograph could not be matched to another photograph in the collection of photographs), that photograph is not user-selectable (e.g., is not displayed to the user as a photograph to be selected for inclusion in the fly-through view). Additionally or alternatively, the user can select photographs from the set of photographs 132 at other times, such as prior to the alignment being performed by the scene alignment module 126, immediately after the photograph collection module 122 obtains the set of photographs 132, and so forth.

The fly-through view generation module 128 knows the camera pose for each selected photograph from the scene alignment module 126, and determines the path taken by the user from one camera location to the next. This path can be determined in a variety of different manners. In one or more implementations, the actual path taken during the trip is known (e.g., because of GPS tracking being performed during the trip, because of the user specifying a name or identifier of a hiking trail he or she followed, and so forth). In such situations, the fly-through view generation module 128 obtains the actual path taken during the trip (e.g., from storage on the computing device 102 or elsewhere) and uses that actual track as the path taken by the user for the trip. Additionally or alternatively, the actual path taken for all or part of the trip may not be available. In such situations, the fly-through view generation module 128 estimates the path taken by the user for the trip.

This path estimation can be performed in various manners, such as by constructing a Catmull-Rom spline with the camera locations of the selected photographs as control points. The fly-through view generation module 128 initializes the set of control points with the locations of the selected photographs. Additional locations from the non-selected photographs (photographs in the set of photographs 132 that were not selected by the user) are added to the set of control points in a greedy manner. For example, a location of a non-selected photograph is added to the set of control points only if the location of the non-selected photograph is further than a threshold distance (e.g., 100 meters) from all other points in the set of control points. The control points in the set of control points are sorted according to the time of capture of the corresponding photograph (e.g., obtained from metadata such as Exchangeable Image File data associated with the photograph). The fly-through view generation module 128 generates the Catmull-Rom spline from the sorted set of control points. If any point of the Catmull-Rom spline is located below the terrain, the camera locations are moved above the ground by a particular amount (e.g., 1.8 meters). The generated spline is then optionally smoothed, such as by using a low-pass box filter.

The fly-through view generation module 128 also determines camera orientation along the path taken by the user for the trip by interpolating the camera orientation to look in the direction of the next control point. For example, for transitions from one photograph to the next, the fly-through view generation module 128 uses spherical interpolation between the camera orientations of the photographs associated with the two photographs, with the camera located at the center of the sphere to achieve near-constant angular speed.

The fly-through view generation module 128 generates a fly-through view through the terrain model 134 along the path taken by the user for the trip. The camera orientations for the fly-through view are the camera orientations of the cameras at the locations that the selected photographs were taken, and in between those locations the camera orientations are the interpolated camera orientations discussed above.

The fly-through view can be maintained in storage 108 and/or communicated to another computing device. Once generated, the fly-through view can be displayed on the computing device 102, or alternatively on one or more other computing devices which need not include a trip visualization generation system 104.

The fly-through view can be a passive fly-through view or an interactive fly-through view. In the passive fly-through view situation, the fly-through view cross-fades from the end of the fly-through segment (ending at a location where a selected photograph was captured) to the photograph captured at that location. The actual photograph taken by the user at that location is displayed and the area beyond the photograph is filled in with data from the terrain model 134. The orientation of the photograph within the fly-through view is the same orientation as the camera had when the photograph was captured. The fly-through view then cross-fades to the next segment heading towards the next location along the path taken by the user for the trip.

In the interactive fly-through view situation, rather than simply pausing cross-fade into a photograph captured at a location, the user can freely look around the location (e.g., in a 360 degree view), such as by using a VR headset. In response to a user request, the fly-through view resumes with displaying the next segment heading towards the next location along the path taken by the user for the trip. The photograph taken by the user can be displayed at the location without the area beyond the photograph being filled in with data from the terrain model 134 (e.g., in situations in which the photograph was taken by a panoramic camera), or can be the photograph captured by the user and the area beyond the photograph is filled in with data from the terrain model 134, the photograph is rendered with as captured.

It should be noted that the fly-through view generated for a trip can be a passive fly-through view, an interactive fly-through view, or a combination thereof. For example, at some locations along a trip the captured photograph is displayed as part of a passive fly-through view, and at other locations along the same trip the captured photograph is displayed as part of an interactive fly-through view.

Example Procedure

The following discussion describes techniques that may be implemented utilizing the previously described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In portions of the following discussion, reference will be made to FIGS. 1-8.

Figure 9:
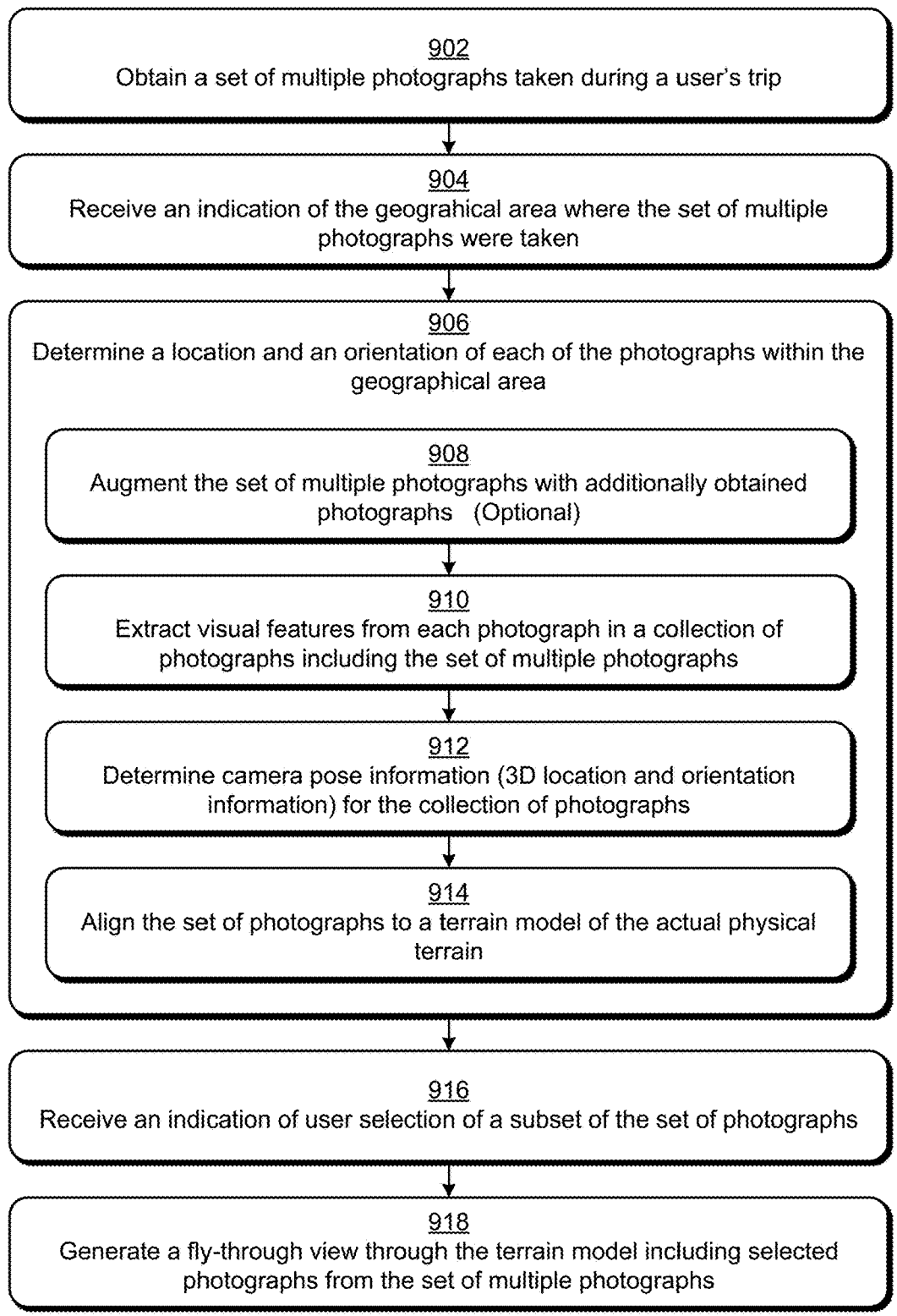
FIG. 9 is a flow diagram depicting a procedure in an example implementation of generating immersive trip photograph visualizations.

FIG. 9 is a flow diagram depicting a procedure in an example implementation of generating immersive trip photograph visualizations. In this example, the trip visualization generation system 104 obtains a set of multiple photographs taken during a user's trip (block 902). The set of multiple photographs can be obtained in response to a variety of different events, such as a user input requesting to have an immersive trip photograph visualization generated. The user input can be received in various manners, such as via a mouse or other cursor control device, detecting an object (e.g., finger or stylus) touching a touchscreen of the display device 112, and so forth.

An indication of a geographical area where the set of multiple photographs were taken is received (block 904). This geographical area indication can be obtained from various sources, such as from the set of multiple photographs obtained in block 902, from a user input (e.g., a selection of the geographical area on a map), and so forth.

A location and an orientation of each of the set of multiple photographs within the geographical area is determined (block 906). As part of this determination, the set of multiple photographs are optionally augmented with additional obtained photographs (block 908). These additionally obtained photographs, also referred to as augmentation photographs, can be obtained from various different Web services or photograph stores. Block 908 is optional. If there are sufficient photographs in the set of photographs then augmentation photographs are not obtained in block 908.

Visual features are extracted from each photograph in a collection of photographs (block 910). The collection of photographs includes the set of photographs obtained in block 902 along with any augmentation photographs obtained in block 908. Various different visual features can be extracted, such as corners.

Camera pose information is determined for the collection of photographs (block 912). The camera pose information is obtained for each photograph in the collection of photographs based on the visual features extracted in block 910. The camera pose information refers to the 3D location of the camera and the orientation of the camera. The orientation of the camera refers to the direction the image capture device is pointing when a photograph is captured (e.g., as measure in an x, y, z coordinate system).

The set of photographs are aligned to a terrain model (block 914). The terrain model is a 3D model (e.g., a digital elevation model) of the environment (e.g., a geographical area) in which the trip occurred. The alignment in block 914 fine-tunes the camera pose estimations determined in block 912 based on the data in the terrain model.

An indication of a user selection of a subset of the set of photographs is also received (block 916). This subset of photographs is the photographs the user desires to show to other viewers. Typically the subset of photographs includes less than all of the photographs in the set of multiple photographs taken during the user's trip, although in some situations the subset of photographs can include all of the photographs in the set of multiple photographs taken during the user's trip.

A fly-through view through the terrain model including selected photographs from the set of multiple photographs is generated (block 918). The fly-through view can be a passive fly-through view and/or an interactive fly-through view. The generated fly-through view can be saved using any of a variety of data storage structures and formats, can be displayed to viewers, and so forth.

Example System and Device

Figure 10:
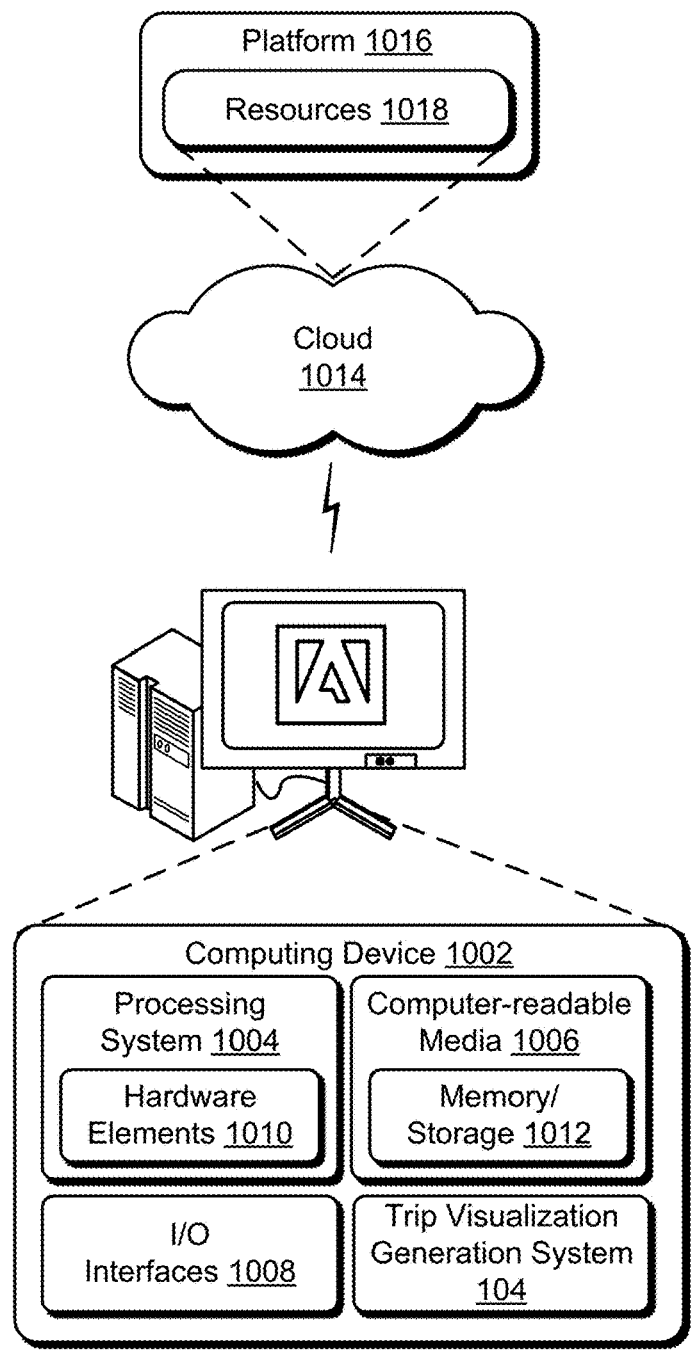
FIG. 10 illustrates an example system including various components of an example device that can be implemented as any type of computing device as described and/or utilized with reference to FIGS. 1-9 to implement embodiments of the techniques described herein.

FIG. 10 illustrates an example system generally at 1000 that includes an example computing device 1002 that is representative of one or more computing systems and/or devices that may implement the various techniques described herein. This is illustrated through inclusion of the trip visualization generation system 104. The computing device 1002 may be, for example, a server of a service provider, a device associated with a client (e.g., a client device), an on-chip system, and/or any other suitable computing device or computing system.

The example computing device 1002 as illustrated includes a processing system 1004, one or more computer-readable media 1006, and one or more I/O interface 1008 that are communicatively coupled, one to another. Although not shown, the computing device 1002 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware element 1010 that may be configured as processors, functional blocks, and so forth. This may include implementation in hardware as an application specific integrated circuit or other logic device formed using one or more semiconductors. The hardware elements 1010 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1006 is illustrated as including memory/storage 1012. The memory/storage 1012 represents memory/storage capacity associated with one or more computer-readable media. The memory/storage component 1012 may include volatile media (such as random access memory (RAM)) and/or nonvolatile media (such as read only memory (ROM), Flash memory, optical disks, magnetic disks, and so forth). The memory/storage component 1012 may include fixed media (e.g., RAM, ROM, a fixed hard drive, and so on) as well as removable media (e.g., Flash memory, a removable hard drive, an optical disc, and so forth). The computer-readable media 1006 may be configured in a variety of other ways as further described below.

Input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1002 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1002. By way of example, and not limitation, computer-readable media may include "computer-readable storage media" and "computer-readable signal media."

"Computer-readable storage media" may refer to media and/or devices that enable persistent and/or non-transitory storage of information. Computer-readable storage media refers to non-signal bearing media, in contrast to mere signal transmission, carrier waves, or signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1002, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1010 and computer-readable media 1006 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1010. The computing device 1002 may be configured to implement particular instructions and/or functions corresponding to the software and/or hardware modules. Accordingly, implementation of a module that is executable by the computing device 1002 as software may be achieved at least partially in hardware, e.g., through use of computer-readable storage media and/or hardware elements 1010 of the processing system 1004. The instructions and/or functions may be executable/operable by one or more articles of manufacture (for example, one or more computing devices 1002 and/or processing systems 1004) to implement techniques, modules, and examples described herein.

The techniques described herein may be supported by various configurations of the computing device 1002 and are not limited to the specific examples of the techniques described herein. This functionality may also be implemented all or in part through use of a distributed system, such as over a "cloud" 1014 via a platform 1016 as described below.

The cloud 1014 includes and/or is representative of a platform 1016 for resources 1018. The platform 1016 abstracts underlying functionality of hardware (e.g., servers) and software resources of the cloud 1014. The resources 1018 may include applications and/or data that can be utilized while computer processing is executed on servers that are remote from the computing device 1002. Resources 1018 can also include services provided over the Internet and/or through a subscriber network, such as a cellular or Wi-Fi network.

The platform 1016 may abstract resources and functions to connect the computing device 1002 with other computing devices. The platform 1016 may also serve to abstract scaling of resources to provide a corresponding level of scale to encountered demand for the resources 1018 that are implemented via the platform 1016. Accordingly, in an interconnected device embodiment, implementation of functionality described herein may be distributed throughout the system 1000. For example, the functionality may be implemented in part on the computing device 1002 as well as via the platform 1016 that abstracts the functionality of the cloud 1014.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium generation environment, a method implemented by at least one computing device, the method comprising:
   obtaining a set of photographs taken on a trip in which a user followed a path through a geographical area;
   receiving a three dimensional terrain model of the geographical area;
   receiving an indication of the geographical area where the set of photographs were captured;
   determining both a location and an orientation of ones of the set of photographs within the three dimensional terrain model of the geographical area;
   receiving an indication of user-selected photographs of the set of photographs; and
   generating a fly-through view through the three dimensional terrain model, the fly-through view along the path through the geographical area, the fly-through view comprising a sequence of images along the path displayed as a video, the sequence of images including each of the user-selected photographs as well as, for each of the user-selected photographs, data from the three dimensional terrain model that fills in data surrounding the user-selected photograph.

2. The method as described in claim 1, wherein the determining comprises:
   determining whether the set of photographs includes at least a threshold number of photographs that capture a particular area on the trip; and
   augmenting the set of photographs with one or more additional photographs in response to the set of photographs not including at least the threshold number of photographs that capture the particular area on the trip, but excluding the one or more additional photographs from the fly-through view.

3. The method as described in claim 1, wherein the determining comprises:
   extracting visual features from each photograph in the set of photographs;
   determining, based on the visual features, both three dimensional location information and orientation information for each photograph in the set of photographs;
   reconstructing terrain represented in the set of photographs by generating a point cloud from the set of photographs; and
   aligning the reconstructed terrain with the three dimensional terrain model to fine-tune the three dimensional location information and the orientation information for each photograph in the set of photographs.

4. The method as described in claim 3, wherein the reconstructing comprises using a structure from motion pipeline to generate the point cloud.

5. The method as described in claim 1, wherein receiving the indication of the geographical area comprises receiving a selection of the geographic area from the user.

6. The method as described in claim 1, wherein generating the fly-through view comprises determining the path through the geographical area based on locations where the user-selected photographs were captured.

7. The method as described in claim 6, wherein determining the path comprises using a Catmull-Rom spline with the locations of each of the user-selected photographs as control points.

8. The method as described in claim 1, wherein generating the fly-through view comprises using as the path through the geographical area an actual path followed by the user based on GPS location data obtained during the trip.

9. The method as described in claim 1, wherein generating the fly-through view comprises determining, as the fly-through view progresses from a first location on the path where a first photograph of the set of photographs was captured to a second location on the path where a second photograph of the set of photographs was captured, a camera orientation by interpolating the camera orientation associated with the photograph captured at the first location and the camera orientation associated with the photograph captured at the second location.

10. The method as described in claim 1, wherein the fly-through view comprises images generated from the three dimensional terrain model between locations along the path where user-selected photographs were captured.

11. The method as described in claim 10, wherein the fly-through view comprises a passive fly-through view in which at each location where a user-selected photograph was captured, the user-selected photograph is displayed.

12. The method as described in claim 10, wherein the fly-through view comprises an interactive fly-through view in which at each location where a user-selected photograph was captured, the user-selected photograph is displayed and a viewer can look around the location in a 360 degree view.

13. In a digital medium generation environment, a device comprising:
   one or more processors;
   one or more computer-readable storage media having stored thereon multiple instructions that, in response to execution by the one or more processors, cause the one or more processors to:
   obtain a set of photographs taken on a trip in which a user followed a path through a geographical area;
   receive a three dimensional terrain model of the geographical area;
   receive an indication of the geographical area where the set of photographs were captured;
   determine both a location and an orientation of ones of the set of photographs within the three dimensional terrain model of the geographical area;
   receive an indication of user-selected photographs of the set of photographs; and
   generate a fly-through view through the three dimensional terrain model, the fly-through view along the path through the geographical area, the fly-through view comprising a sequence of images along the path displayed as a video including each of the user-selected photographs as well as, between the user-selected photographs, images generated from the three dimensional terrain model.

14. The device as described in claim 13, wherein the multiple instructions that cause the one or more processors to determine both the location and the orientation of ones of the set of photographs comprise instructions that cause the one or more processors to:

extract visual features from each photograph in the set of photographs;

determine, based on the visual features, both three dimensional location information and orientation information for each photograph in the set of photographs;

reconstruct terrain represented in the set of photographs by generating a point cloud from the set of photographs; and align the reconstructed terrain with the three dimensional terrain model to fine-tune the dimensional location information and the orientation information for each photograph in the set of photographs.

15. The device as described in claim 13, wherein the fly-through view comprises a passive fly-through view in which at each location where a user-selected photograph was captured, the user-selected photograph is displayed and an area surrounding the user-selected photograph is filled in with data from the three dimensional terrain model.

16. The device as described in claim 13, wherein the fly-through view comprises an interactive fly-through view in which at each location where a user-selected photograph was captured, the user-selected photograph is displayed and a viewer can look around the location in a 360 degree view.

17. In a digital medium generation environment, a system comprising:

means for obtaining a set of photographs taken on a trip in which a user followed a path through a geographical area;

means for receiving a three dimensional terrain model of the geographical area;

means for receiving an indication of the geographical area where the set of photographs were captured;

means for determining both a location and an orientation of ones of the set of photographs within the three dimensional terrain model of the geographical area;

means for receiving an indication of user-selected photographs of the set of photographs; and means for generating a fly-through view through the three dimensional terrain model and along the path through the geographical area, the fly-through view comprising a sequence of images along the path displayed as a video, the sequence of images including each of the user-selected photographs as well as, for each of the user-selected photographs, data from the three dimensional terrain model that fills in data surrounding the user-selected photograph.

18. The system as described in claim 17, wherein the means for determining comprises:

means for extracting visual features from each photograph in the set of photographs;

means for determining, based on the visual features, both three dimensional location information and orientation information for each photograph in the set of photographs;

means for reconstructing terrain represented in the set of photographs by generating a point cloud from the set of photographs; and means for aligning the reconstructed terrain with the three dimensional terrain model to fine-tune the dimensional location information and the orientation information for each photograph in the set of photographs.

19. The system as described in claim 17, wherein the fly-through view comprises images generated from the three dimensional terrain model between locations along the path where user-selected photographs were captured, and wherein the fly-through view comprises a passive fly-through view in which at each location where a user-selected photograph was captured, the user-selected photograph is displayed.

20. The system as described in claim 17, wherein the fly-through view comprises images generated from the three dimensional terrain model between locations along the path where user-selected photographs were captured, and wherein the fly-through view comprises an interactive fly-through view in which at each location where a user-selected photograph was captured, the user-selected photograph is displayed and a viewer can look around the location in a 360 degree view.

\* \* \* \* \*